Figure 1:
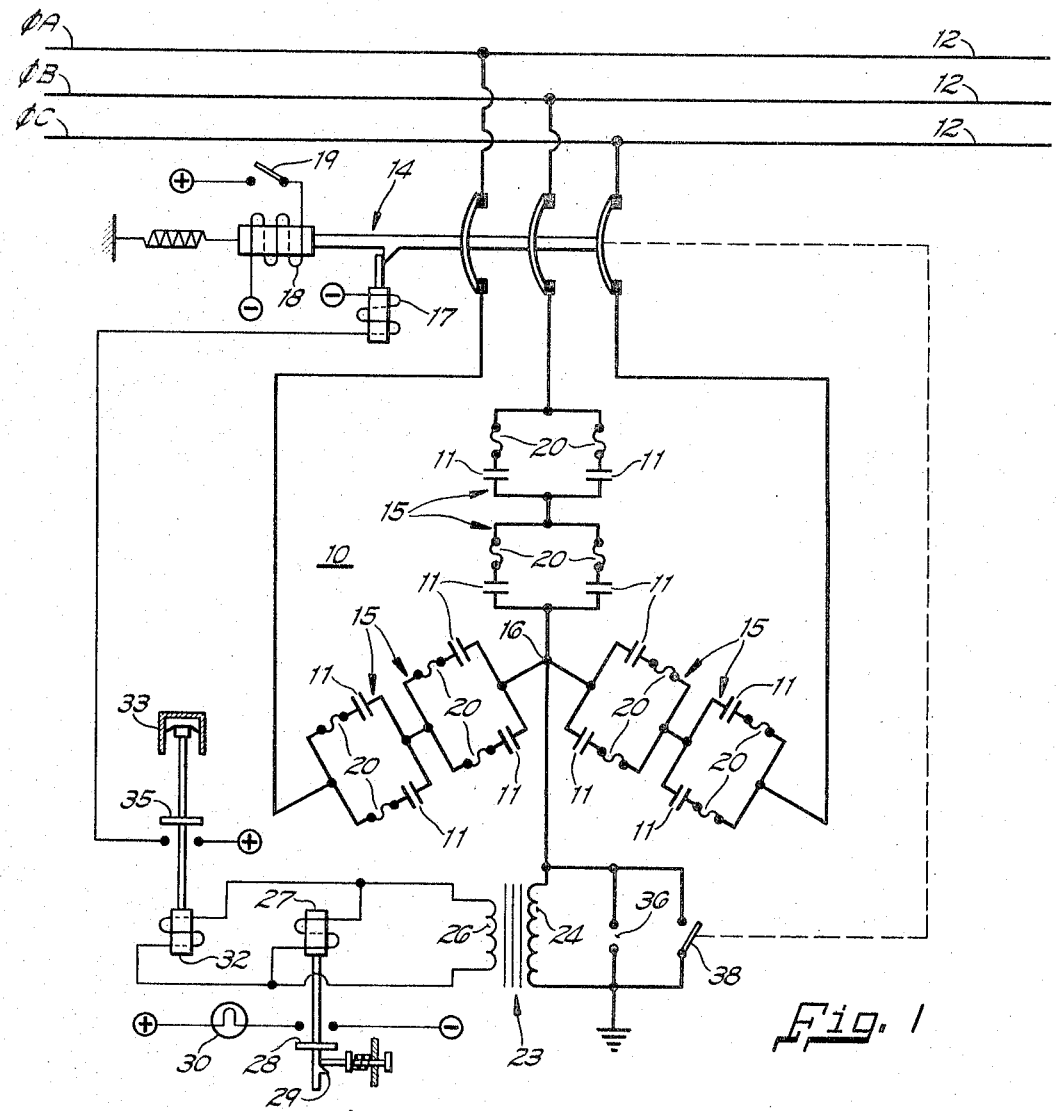

Oct. 17, 1967

D. J. LEMENS 3,348,097

CAPACITOR BANK HAVING UNBALANCE DETECTING PROTECTIVE MEANS

Filed March 1, 1965

INVENTOR.
Donald J. Lemens
BY
Lee H. Kaiser
Attorney

United States Patent Office 3,348,097
Patented Oct. 17, 1967

3,348,097
CAPACITOR BANK HAVING UNBALANCE DETECTING PROTECTIVE MEANS
Donald J. Lemens, Fort Atkinson, Wis., assignor to McGraw-Edison Company, Milwaukee, Wis., a corporation of Delaware
Filed Mar. 1, 1965, Ser. No. 436,059
5 Claims. (Cl. 317—12)

This invention relates to shunt capacitor banks for alternating current transmission or distribution lines and, in particular, to the protection of high voltage shunt capacitor banks against damage resulting from failure of individual capacitor units or shorted series groups.

Capacitors are frequently connected to alternating current power lines to improve the power factor, to reduce line losses, and to decrease the voltage drop. Conventionally power factor correcting capacitors are connected to a power line either directly in shunt or in series-parallel groups with each group comprising a number of capacitor units connected in parallel and with the groups connected in series from phase-to-phase or from phase-to-neutral of the distribution or transmission system. If the dielectric of a capacitor unit fails, an internal arc in the capacitor may rupture the casing and damage adjacent good capacitors if the faulted capacitor unit is not immediately disconnected. Consequently, it is customary to connect each capacitor unit in series with an individual fuse which will rupture and disconnect the capacitor from the bank upon failure of the capacitor. When a fuse blows on one capacitor unit of a series group, the impedance of that group in increased and the voltage distribution on the other groups of the bank is changed, and usually unbalance detecting protective means are provided which will disconnect the capacitor bank from the power line when the voltage across any series group exceeds 110% of rated voltage.

A three phase capacitor bank is designed to have equal impedances in each of its three phases so that the bank normally presents a balanced three phase load. Voltage and current of all three phases are theoretically equal and mutually displaced by 120 electrical degrees. Abnormal conditions of operation of a capacitor bank, such as caused by failure of a capacitor unit, may be detected by metering the voltages or currents within the capacitor bank or the relationship of the capacitor bank neutral to ground. Known unbalance detection systems for polyphase capacitor banks include: (1) an ungrounded Y bank split into two sections with the neutrals interconnected through a current transformer; (2) a single ungrounded Y bank with a potential transformer connected between neutral and system ground; and (3) a single Y bank having its neutral grounded through a current transformer.

Star capacitor banks with an ungrounded neutral have such advantages as: (1) eliminating the ground return path for harmonic currents; (2) limiting the fault current within a faulty capacitor unit, thus reducing the possibility of rupturing the unit; and (3) minimizing the danger of damage to adjacent units in the event of failure of a single unit. On the other hand, a star bank with a grounded neutral discharges surges to ground and frequently permits use of capacitor units having a lower insulation level than that corresponding to the circuit voltage.

It is an object of the invention to provide a three phase shunt capacitor bank with unbalance detection protective means which has the advantage of a floating neutral Y bank and also has certain of the advantages associated with a grounded Y capacitor bank.

It is a further object of the invention to provide a three phase shunt capacitor bank which will act as a surge absorber and yet will not cause communication interference due to harmonic current flow and is protected by unbalance detecting means which are more sensitive and yet considerably less expensive than prior art unbalance detecting means.

Another object of the invention is to provide a three phase shunt capacitor bank having unbalance detecting means which permits reduction in the insulation level of the capacitor bank neutral and of the capacitor units and which also reduces the maximum recovery voltage demand and the cost of the three phase switches for connecting the capacitor bank to the power system.

Figure 2:
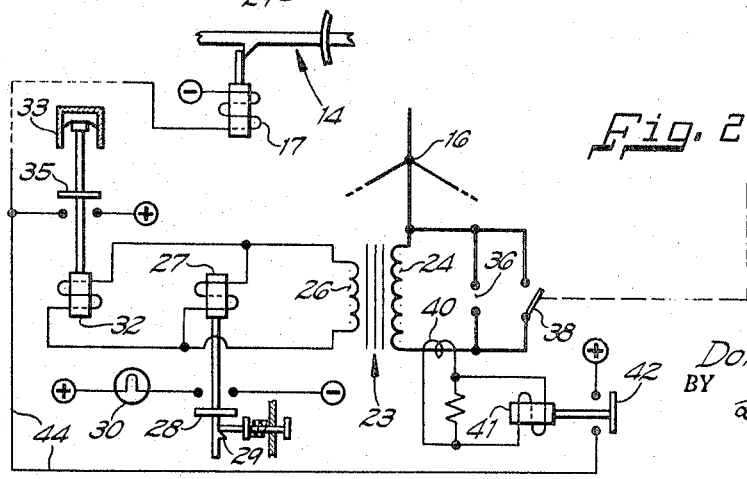

These and other objects and advantages of the invention will be more readily apparent from the following detailed description when taken in connection with the accompanying drawing wherein:

FIG. 1 is a schematic circuit diagram of a capacitor bank embodying the invention, and FIG. 2 is a partial schematic circuit diagram of an alternative embodiment of the invention.

The invention is shown in the drawing applied to a three phase, high voltage, Y connected capacitor bank 10 comprising a plurality of capacitor units 11 connected to a three phase alternating current power line 12 by three phase switch means such as a circuit breaker 14. The capacitor units 11 may be arranged in series groups 15 of paralleled capacitor units and with a plurality of groups 15 connected in series between each phase conductor $\phi_A$, $\phi_B$ and $\phi_C$ and the neutral 16 of the Y capacitor bank 10. The circuit breaker 14 is shown in the drawing as having a trip coil 17 and a closing coil 18 which is preferably controlled automatically as described hereinafter or may be controlled manually as indicated by switch 19.

The three phases of the star capacitor bank 10 are identical, and each phase is shown in the drawing as comprising two groups 15 in series and with two capacitor units 11 in parallel in each series group 15, but it will be understood that in an actual installation there may be a large number of capacitor units 11 in parallel in each series group 15 and that any desired number of groups 15 may be connected between each phase conductor $\phi$ and the neutral 16 dependent upon the voltage of the power system. Inasmuch as the impedances of the three phases are normally equal so that the capacitor bank presents a balanced three phase load to the power system, the voltage and current of all three phases are theoretically equal and mutually displaced by 120 electrical degrees. The capacitor units 11 are protected by individual fuses 20. If one or more of the individual fuses 20 are blown as a result of failure of the corresponding capacitor unit 11, the impedance of the series group 15 which contained the faulted capacitor unit will be changed, and the voltage distribution across the three phases of the capacitor bank will vary and result in shift of neutral 16.

In order to protect against overvoltage on any series group 15, a potential transformer 23 is provided having its primary winding 24 connected between neutral 16 and ground. The secondary 26 of potential transformer 23 may be connected across the operating coil of voltage sensitive relay 27. The movable contact 28 of relay 27 may be connected in the circuit of a suitable signaling or indicating means such as an indicating lamp 30 or a buzzer (not shown) so that, when movable contact 28 operates, the lamp 30 lights or the buzzer sounds to provide an indication of overvoltage on the capacitor bank, and the movable contact 28 is shown provided with latching means 29 to hold it in operating position once relay 27 operates to maintain energization of the lamp 30.

A slower operating relay 32 is also connected across the secondary 26 of potential transformer 23. Relay 32 may be of the slow-to-operate type as is diagrammatically indicated by dashpot 33, and relay 32 has a movable contact 35 connected in a control circuit for the trip coil 17 of circuit breaker 14 so that when relay 32 operates to close its contact 35, the trip coil 17 is energized and circuit breaker 14 opens to disconnect the capacitor bank 10 from the power line 12.

In accordance with the invention means are provided to prevent the voltage of capacitor bank neutral 16 from exceeding a predetermined magnitude relative to ground both during normal operation and during switching of the capacitor bank onto and off the power line 12, thereby allowing reduction of the insulation level of bank neutral 16, the capacitor units 11, and the potential transformer 23 below that corresponding to the power line voltage. A protective gap 36 is connected across the primary winding 24 between neutral 16 and ground. A bypass switch 38 is also connected in parallel with primary winding 24 and gap 36 between neutral 16 and ground, and bypass switch is adapted when closed during operation of circuit breaker 14 to prevent shift of capacitor bank neutral 16 during connection and disconnection of capacitor bank 12. It will be appreciated that bypass switch 38 can be manually controlled to ground neutral 16 during operation of circuit breaker 14 and thus prevent shift of neutral 16 during switching of capacitor bank 10, but preferably bypass switch 38 is interlocked with circuit breaker 14 so that circuit breaker 14 cannot be opened until bypass switch 38 is closed and so that bypass switch 38 will open after the main switch closes. Suitable means for interlocking the three phase main switch means and the bypass switch so that neutral 16 always remains at ground potential during switching of the capacitor bank are disclosed in U.S. Patent 2,918,558 to Rittenhouse et al.

Bypass switch 38 is open during normal operation so that the ground path for harmonic currents is eliminated and inductive interference with nearby telephone lines is prevented, but gap 36 sparks over in the event that surge voltage appears at neutral 16 during normal operation as a result of lightning or of switching on the power circuit, thereby bypassing the surge to ground and preventing the potential of neutral 16 from exceeding the breakdown potential of gap 36 and protecting the potential transformer primary 24. The disclosed capacitor bank construction acts as an absorber for surges that may appear on power line 12. Further, the gap 36 will spark over if a severe unbalance occurs within capacitor bank 10 during normal operating conditions and thus prevents excessive voltage from appearing across potential transformer 23. Inasmuch as bypass switch 38 and gap 36 limit the maximum potential which can occur at any time between bank neutral 16 and ground, the insulation of neutral 16 can be of a voltage class less than that of the power system, thereby materially reducing the cost of such components of the bank as the porcelain insulators which support the metallic framework of an open type bank. Further, this often permits using capacitor units 11 having a lower insulation level than that corresponding to the power line voltage.

In one conventional method of protecting a single ungrounded Y capacitor bank against unbalance, a potential transformer of the power system class is connected between the capacitor bank neutral and ground. For example, in a capacitor bank for a 46 kilovolt system, a potential transformer having insulation rated for 46 kilovolts is conventionally utilized. A potential transformer is an expensive device, and the cost thereof increases in proportion to the voltage rating. In the present invention, the insulation level for potential transformer 23 may be substantially less than that of the power system 12. For example, if power system 12 is rated at 46 kilovolts, potential transformer may have insulation of the five kilovolt class, and it will be apparent that this reduction in voltage rating for potential transformer 23 greatly reduces the cost of the unbalance detecting means. Further, the transformation ratio between primary winding 24 and secondary 26 of a potential transformer rated at the lower (five kilovolt) potential is substantially less than one rated at forty-six kilovolts, thereby greatly increasing the sensitivity of the unbalance detecting means.

The invention is particularly advantageous in capacitor banks of the voltage divider type disclosed in such representative U.S. Patents as 2,887,647 to Strozier and U.S. 2,869,070 to Minder, both of which have the same assignee as the subject invention, wherein isolating transformers are connected in cascade between the capacitor bank neutral and the source of control signals for actuating the switches which connect the capacitor bank to the power line. The disclosed invention eliminates, or at least reduces the number of, isolating transformers connected in cascade between the capacitor bank neutral and the control signal source, and this represents a substantial savings in the cost of the capacitor bank inasmuch as the isolating transformer usually has insulation of the fifteen kilovolt class and is expensive to construct.

Bypass switch 38 in grounding neutral 16 during operation of circuit breaker 14 reduces the maximum recovery voltage that can appear across the three phase line switch, or circuit breaker, 14 during switch opening and thus allows substantial reduction in the voltage class and in the cost of the three phase main switch.

FIG. 2 illustrates an alternative embodiment of the invention wherein capacitor bank protection is maintained even if the bypass switch 38 which short circuits the potential transformer 23 fails to open. A current transformer 40 is connected in the path including bypass switch 38 between capacitor bank neutral 16 and ground. Current transformer 40 is connected across a relay 41 of the low voltage pickup type. Relay 41 has a movable contact 42 adapted when actuated to complete an energizing circuit over conductor 44 to trip coil 17 of circuit breaker 14, thereby opening circuit breaker 14 and removing the capacitor bank 10 from power line 12. In normal operation the impedances of the series groups 15 in each phase are theoretically equal and mutually displaced by 120 electrical degrees and theoretically no current flows through current transformer 40 even if bypass switch 38 fails to open. However, if one or more of the individual fuses 20 are blown as a result of failure of the corresponding capacitor unit 11, the impedance of the series group 15 that contained the faulted capacitor unit 11 will be changed, the voltage distribution across the three phases of the capacitor bank will vary and result in shift of neutral 16, and unbalance current will flow through faulty bypass switch 38 and current transformer 40 and actuate relay 41, thereby completing an operating circuit to trip coil 17 which will open circuit breaker 14 to remove the capacitor bank 10 from the power line.

Although only a few embodiments of the invention have been illustrated and described, many modifications and variations thereof will be readily apparent to those skilled in the art, and consequently it is intended in the appended claims to cover all such modifications and variations which are within the true spirit and scope of the invention.

I claim:

1. In a three phase capacitor bank comprising a plurality of capacitor units and having three phase switch means for connecting said capacitor units in star to a polyphase power system, means including a potential transformer having its primary winding connected between the neutral of said star-connected capacitor units and ground for detecting unbalance in the phases of said polyphase capacitor bank, and means for preventing the voltage of said neutral from exceeding a predetermined magnitude relative to ground during normal operation and during switching of said bank including a spark gap connected between said neutral and ground and a normally open switch also connected between said neutral and ground and constructed and arranged to be closed when said three phase switch means is being operated between open and closed positions.

2. In a three phase capacitor bank comprising a plurality of capacitor units and having three phase switch means for connecting said capacitor units in star to a polyphase power system, protective means for preventing the voltage across said capacitor units from exceeding a predetermined magnitude including a potential transformer having its primary winding connected between the neutral of said star-connected capacitor units and ground, and means for preventing the voltage shift of said neutral relative to ground from exceeding a predetermined magnitude, said last-named means including a protective gap having a predetermined breakdown potential connected between said neutral and ground and a normally open bypass switch also connected between said neutral and ground and being constructed and arranged to be closed when said three phase switch means is being operated between open and closed positions.

3. In a three phase capacitor bank comprising a plurality of capacitor units and having three phase switch means for connecting said capacitor units in star to a polyphase power system, means including a potential transformer having its primary winding connected between the neutral of said star-connected capacitor units and ground for detecting unbalance in the phases of said polyphase capacitor bank, means responsive to said unbalance detecting means for operating said three phase switch means to disconnect said capacitor units from said power system, and means including a spark gap connected between said neutral and ground and a normally open bypass switch also connected between said neutral and ground for preventing the voltage of said neutral relative to ground from exceeding a predetermined magnitude, said bypass switch being interlocked with said three phase switch means to be closed and ground said neutral when said three phase switch means is being operated between open and closed positions.

4. In a three phase capacitor bank comprising a plurality of capacitor units and having three phase switch means for connecting said capacitor units in star to a polyphase power system, means including a potential transformer having its primary winding connected between the neutral of said star-connected capacitor units and ground for detecting unbalance in the phases of said polyphase capacitor bank, means responsive to said unbalance detecting means for operating said three phase switch means to disconnect said capacitor units from said power system, and means including a spark gap connected between said neutral and ground and a normally open bypass switch also connected between said neutral and ground for preventing the voltage of said neutral relative to ground from exceeding a predetermined magnitude, said bypass switch being interlocked with said three phase switch means to be closed and ground said neutral when said three phase switch means is being operated between open and closed positions, said bypass switch being interlocked with said three phase switch means so that said three phase switch means cannot be opened until said bypass switch is closed.

5. In combination with a polyphase power system, a polyphase capacitor bank comprising a plurality of capacitor units connected in star, polyphase switch means for connecting said capacitor bank to said power system, means including a potential transformer having its primary winding connected between the neutral of said bank and ground for detecting unbalance in the phases of said capacitor bank, means responsive to said unbalance detecting means including a relay connected across the secondary of said potential transformer for opening said polyphase switch means, a spark gap in parallel with said primary winding, and normally open bypass switch means in parallel with said primary winding and said spark gap for grounding said neutral while said polyphase switch means is being operated between open and closed positions, whereby the voltage between said neutral and ground cannot exceed the breakdown potential of said spark gap and said potential transformer and said neutral may have an insulation level lower than that of said power system.

References Cited
UNITED STATES PATENTS

| | | | |
|---|---|---|---|
| 2,157,886 | 5/1939 | Cuttino. | |
| 2,550,119 | 4/1951 | Marbury et al. | 317—12 X |
| 2,933,652 | 4/1960 | Cuttino | 317—12 |
| 3,248,607 | 4/1966 | Lemens | 317—12 |

FOREIGN PATENTS

| | | |
|---|---|---|
| 1,064,170 | 12/1953 | France. |

MILTON O. HIRSHFIELD, *Primary Examiner.*

R. V. LUPO, *Assistant Examiner.*